United States Patent [19]
Kilpelainen

[11] Patent Number: 5,211,524
[45] Date of Patent: May 18, 1993

[54] DISCHARGE APPARATUS FOR A SILO

[75] Inventor: Ossi Kilpelainen, Savonlinna, Finland

[73] Assignee: Kone Wood Oy, Hollola, Finland

[21] Appl. No.: 778,145

[22] PCT Filed: Jun. 21, 1990

[86] PCT No.: PCT/FI90/00165

§ 371 Date: Dec. 23, 1991

§ 102(e) Date: Dec. 23, 1991

[87] PCT Pub. No.: WO90/15769

PCT Pub. Date: Dec. 27, 1990

[30] Foreign Application Priority Data

Jun. 22, 1989 [FI] Finland ............................ FI893063

[51] Int. Cl.⁵ ............................................ B65G 65/48
[52] U.S. Cl. .................................... 414/306; 222/200; 222/404
[58] Field of Search ................................ 414/305–310; 222/200, 333, 404, 478

[56] References Cited

U.S. PATENT DOCUMENTS

| | | | |
|---|---|---|---|
| 1,033,854 | 7/1912 | Werk | 414/305 X |
| 1,429,925 | 9/1922 | Cardlot | 222/404 X |
| 1,730,784 | 10/1929 | Rogginger | 222/404 X |
| 2,471,495 | 5/1949 | Pfau | 222/404 X |
| 2,755,942 | 7/1956 | Broberg | 414/306 |
| 3,197,084 | 7/1965 | Von der Lely et al. | 222/404 X |
| 3,203,703 | 8/1965 | Van der Lely et al. | 222/404 X |
| 3,229,665 | 1/1966 | Baltz | 414/306 X |
| 3,874,566 | 4/1975 | Miksitz | 222/404 |
| 4,003,481 | 1/1977 | Proctor | 414/306 |
| 4,095,703 | 6/1978 | Weaver | 414/310 X |
| 4,099,633 | 7/1978 | Cantenot | 414/310 X |
| 4,979,861 | 12/1990 | Kilpelainen et al. | 414/306 |

Primary Examiner—David A. Bucci
Attorney, Agent, or Firm—Sughrue, Mion, Zinn, Macpeak and Seas

[57] ABSTRACT

An apparatus for discharging fine material from a silo with a cylindrical wall 2 and a bottom 3 provided with a central hole 11 and a discharge aperture 4, comprises: a cylindrical skirt 5 suspended from the wall above the bottom and having a crenellated edge formed of projections 6 alternating with spaces 7; a mobile discharge arm 8, having a central connection and two ends trapped in a peripheral zone between the skirt and the periphery of the bottom, for transferring fine material to the discharge aperture; rollers 9, 10 disposed on the ends of the arm for directing the displacement of the arm in cooperation with the skirt; a central revolving shaft 13 passing through the central hole to engage the central connection for rotating the arm; and first and second actuating cylinders 17, 18 acting on the central shaft in substantially perpendicular directions for alternately moving the shaft along the periphery of the central hole such that when a first roller advances on a route outside a projection a corresponding end of the arm advances under the projection, and the second roller is trapped in a space.

16 Claims, 2 Drawing Sheets

DISCHARGE APPARATUS FOR A SILO

FIELD OF THE INVENTION

The present invention relates to an apparatus for discharging fine material, such as fiber stock, wood chips or sawdust from a silo or a similar device via an aperture or apertures in the bottom of the silo.

BACKGROUND OF THE INVENTION

Some prior art solutions for discharging material from the bottom of a silo employ a transport screw turning about the center axis of the silo and extending radially from the wall of the silo to a discharge opening in the center of the bottom. The turning movement can be brought about for example, as disclosed in Finnish patent specification no. 51325, by a hydraulic device disposed at the outer end of the transport screw and communicating with a geared step ring provided outside the silo.

Other prior art solutions for discharging material from the bottom of a silo have discharge arms fixed to a drive shaft disposed centrally in the silo which arms are arranged to move material to a discharge opening or openings of the silo while the shaft rotates. The discharge arms are arranged to be rotated continuously to the same direction or to be moved to and fro by a motor or a hydraulic device. An example of this kind of an apparatus is disclosed in Finnish patent specification no. 47328.

Finnish patent application no. FI 881926 discloses a discharge apparatus for a silo, comprising a double-ended discharge arm pivoted in an excentric pin of a drive shaft disposed centrally in the silo. The movement of the discharge arms is controlled by pins provided at the ends of the discharge arms and by pins disposed at the bottom portion of the silo by means of which rollers are caused to move, when the drive shaft rotates, along a substantially epicycloidal path around the pins thus forcing the discharge arm in a slow "sawing" turning movement.

DISCLOSURE OF THE INVENTION

The object of the invention is to provide an improvement in apparatus having a discharge arm or arms disposed rotatable about the center axis and to move along the bottom of a silo.

An apparatus according to the invention is mainly characterized in that the discharge arm is double-ended and that the movement of the discharge arm is guided by means provided in the ends of the arm and by counter surfaces disposed in the silo and by two cylinders acting on the center of the discharge arm and being disposed substantially perpendicular in relation to each other, so as to move the ends of the arm alternately in the peripheral direction.

In a preferred embodiment of the invention the cylinders are arranged to operate alternately in such a way that one of the cylinders is hydraulically locked with the piston arm in the retracted position or in the extended position while the other cylinder performs a pushing or a pulling motion. The ends of the arm are preferably provided with rollers moving at the outer side of projections from one space between the projections to another, the projections being disposed at the bottom edge of a skirt connected to the wall of the silo.

The most important advantage provided by the discharger of the invention is that the drive means of the discharger is remarkably cheaper than the prior art rotating means. As no rotatable drive shaft is needed also the devices required for bearings, lead-through and sealing of the shaft and for transmission of the torque are dispenced with.

BRIEF DESCRIPTION OF THE DRAWINGS

The invention is described in more detail, by way of example, with reference to the accompanying drawings in which.

DESCRIPTION OF THE PRESENTLY PREFERRED EMBODIMENT

Figure 1:
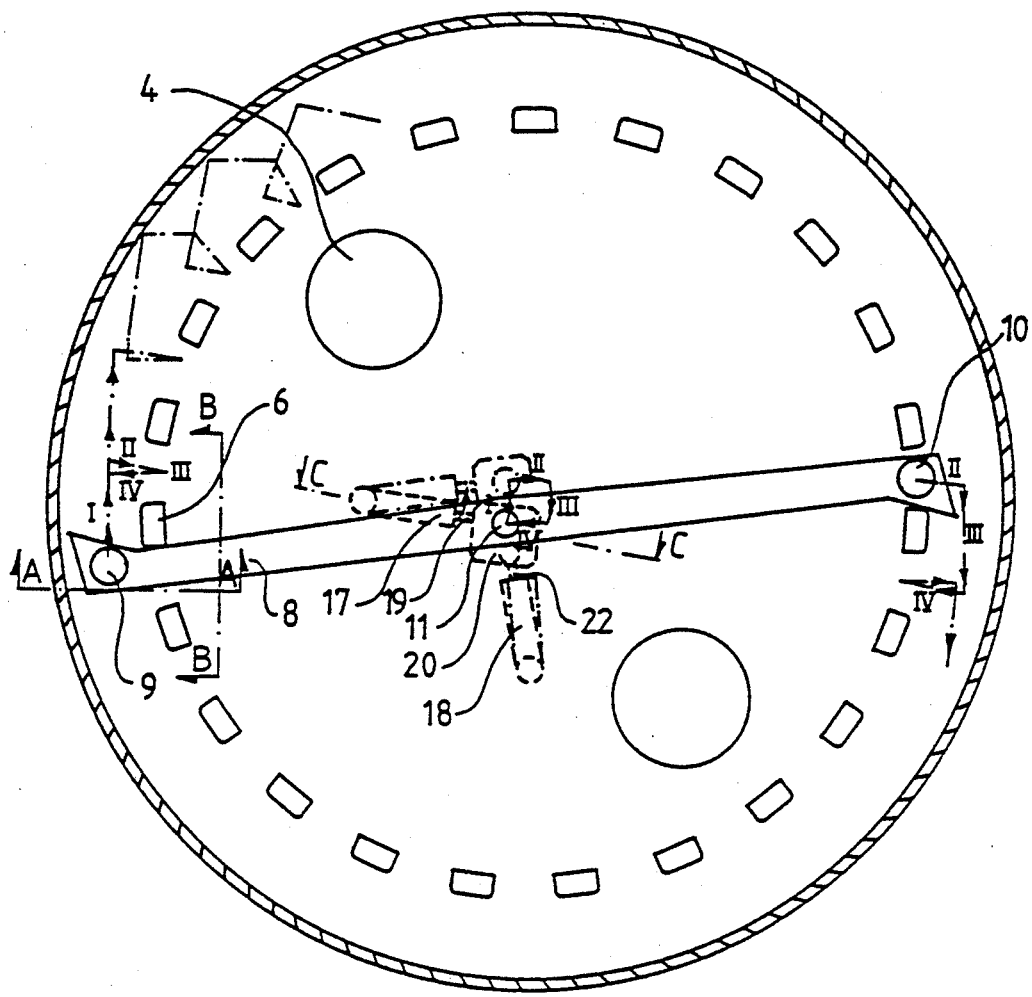
FIG. 1 is a plan view of an embodiment of the invention.

In the figures which illustrate a typical structure according to the invention, the reference numeral 1 refers to a bottom portion of a silo having a cylindrical wall 2 and a planar bottom 3, the bottom having two discharge apertures 4. A skirt 5 is connected to the wall 2 the lower edge of which skirt is formed by adjoining inverted castellations or projections 6 disposed at a distance from each other. The openings between the projections are referred to by reference numeral 7.

A double-ended or double-limbed discharge arm 8 is provided at the bottom of the silo. Rollers 9 and 10 are disposed at the ends and on top of the arm. There is a round hole 11 in the center of the discharge arm and a spherical bearing 12 in the hole 11. The top end of a movable shaft 13 provided under the bottom 3 is pivoted in the spherical bearing. The lower end of the shaft 13 is pivoted in a spherical bearing 16 provided in a lever 15 journalled in a support 14 fixed to the bottom.

Two hydraulic cylinders 17 and 18 disposed substantially in opposite positions relative to each other under the silo are journalled at their rear ends to the bottom of the silo. A piston arm 19 of the cylinder 17 is connected to a connecting piece 20 provided with a spherical bearing 21 through which the movable shaft 13 passes and to which said shaft has been pivoted. A piston arm 22 of the cylinder 18 is pivoted to the connecting piece 20.

There is a hole 23 in the bottom through which the movable shaft 13 passes. A cover 24 moving with the discharge arm 8 covers the hole.

The apparatus according to the invention operates in the following way:

Stage I: Cylinder 18 is hydraulically locked with the piston arm in the retracted position. Cylinder 18 pushes. Roller 10 lies nearly still between the projections 6. Roller 9 moves at the outer side of the projections substantially in the peripheral direction.

Stage II: Cylinder 18 is hydraulically locked with the piston arm in the extended position. Cylinder 17 pushes. Roller 10 is released from the guidance of the projections 6. Roller 9 moves substantially radially inwards to be guided between the projections 6.

Stage III: Cylinder 17 is hydraulically locked with the piston arm in the extended position. Cylinder 18 pulls. Roller 10 moves at the outer side of the projections 6 substantially in the peripheral direction. Roller 9 lies nearly still between the projections 6.

Stage IV: Cylinder 18 is hydraulically locked with the piston arm in the retracted position. Cylinder 17 pulls. Roller 9 moves substantially radially outwards away from the guidance of the projections 6. Roller 10 moves substantially inwards between projections 6.

While one of the cylinders is locked alternately in the retracted position or in the extended position and functions as an oscillating arm and the other cylinder pushes or pulls the center of the discharge arm moves around the center of the bottom of the silo along an almost square path.

The invention is not limited to the embodiment described here but it can be modified within the scope of protection defined by the patent claims. Thus the movement of the discharge arm can be guided with the cylinders in such a way that its center moves along a circular path whereby the rollers at the ends of the arm move along an almost epicycloidal path.

Figure 2:
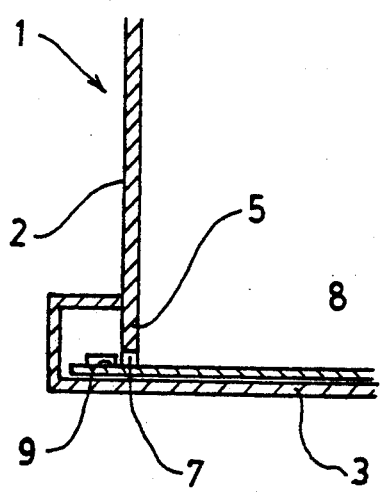
FIG. 2 is a section along line A—A of FIG. 1.
Figure 3:
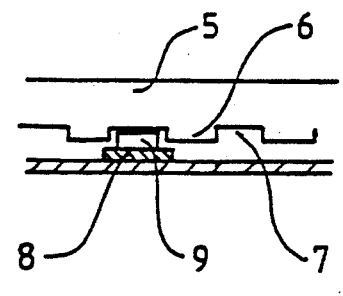
FIG. 3 is a section along line B—B of FIG. 1.
Figure 4:
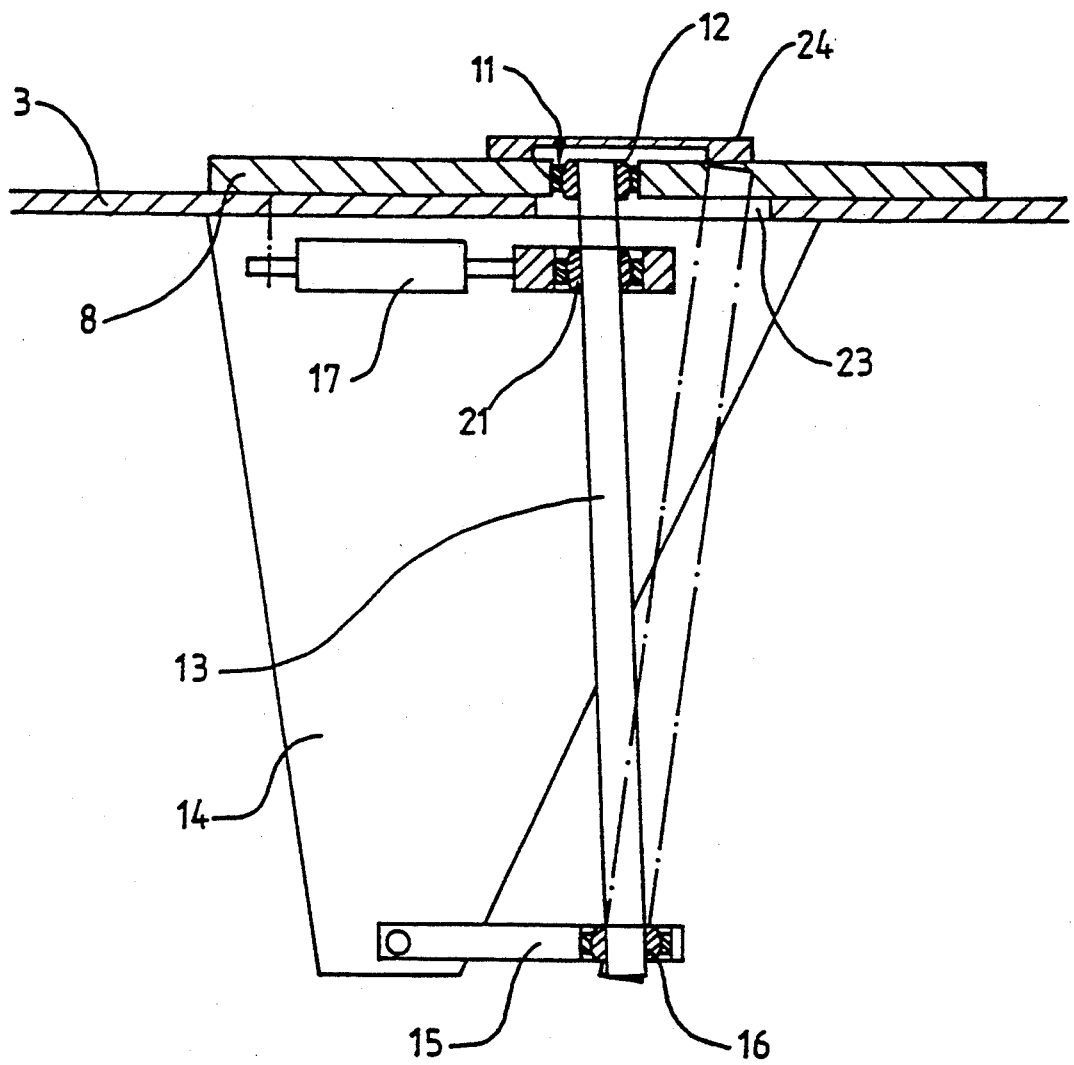
FIG. 4 is a section along line C—C of FIG. 1.

The projections can be located in the bottom of the silo as in Finnish patent application no. 881926, FIG. 2.

We claim:

1. An apparatus for discharging fine material from a silo having a cylindrical wall (2) and a bottom (3) with a discharge aperture (4), comprising:
    (a) a discharge arm (8) having two opposed ends, said arm being displaceable over the bottom of the silo, to transfer fine material to a vicinity of said discharge aperture;
    (b) means for rotating said discharge arm about a central connection thereof; and
    (c) first and second actuating means (17, 18) acting on the central connection in substantially perpendicular directions, for moving said central connection along a generally rectangular trajectory.

2. An apparatus as claimed in claim 1, wherein each of the first and second actuating means comprises a hydraulic cylinder having a body and a piston traveling between two extreme positions, said cylinders operating alternately in such a way that the piston of one cylinder stops at an extreme position while the piston of the other cylinder displaces said central connection.

3. An apparatus as claimed in claim 1, wherein the bottom of said silo has a hole in a central area for defining said rectangular trajectory of the central connection along a periphery of the hole.

4. An apparatus as claimed in claim 1, further comprising guiding means, cooperatively arranged on the arm and on the wall, for directing the trajectory of the arm ends.

5. An apparatus as claimed in claim 1, wherein the means for rotating said discharge arm comprises a driven revolving shaft having one end journalled in the central connection and another, opposite end connected to a support.

6. An apparatus as claimed in claim 5, wherein the bottom of said silo has a hole in a central area, and the actuating means are coupled to said shaft for directing the displacement of the shaft along a periphery of the hole.

7. An apparatus as claimed in claim 4, wherein said guiding means comprises:
    a skirt suspended along a periphery of said wall and having a crenellated edge formed by projections alternating with spaces; and
    first and second rollers individually mounted on opposite ends of the arm with rotational axes thereof perpendicular to the bottom of the silo such that said first roller advances on a route outside the skirt guided by a projection while a corresponding arm end advances under said projection, when said second roller is trapped in a space between two adjacent projections.

8. An apparatus for discharging fine material from a silo having a cylindrical wall and a bottom provided with a central hole and a discharge aperture, comprising:
    (a) a cylindrical counter surface, suspended from said wall above the bottom;
    (b) a mobile discharge arm, having a central connection and two ends trapped in a peripheral zone defined between the counter surface and a periphery of said bottom, for transferring fine material in a vicinity of said discharge aperture;
    (c) leading means disposed on said arm ends, for directing the displacement of said arm in cooperation with said counter surface;
    (d) a central revolving shaft, passing through said central hole and engaging said central connection, for rotating said arm; and
    (e) first and second actuating means acting on the central shaft in substantially perpendicular directions for alternately moving said shaft along a periphery of said central hole.

9. An apparatus as claimed in claim 8, wherein the counter surface comprises a plurality of projections arranged in a circle close to the wall of the silo, forming a like number of spaces between the projections.

10. An apparatus as claimed in claim 9, wherein the projections (6) are located at a lower edge of a skirt connected to the wall of the silo.

11. An apparatus as claimed in claim 9 or 10, wherein the projections are substantially square.

12. An apparatus as claimed in claim 9, wherein said leading means are rollers journalled at the ends of the discharge arm having a diameter smaller than the spaces between the projections.

13. An apparatus as claimed in claim 12, wherein the rollers are arranged to move from one space between the projections to another in the peripheral zone, at an outer side of the projections.

14. An apparatus as claimed in claim 8, wherein each actuating means comprises a hydraulic cylinder having a body and a piston for traveling between two extreme positions, said cylinders operating alternately such that, when one piston stops at an extreme position, the other piston displaces the central connection.

15. An apparatus as claimed in claim 14, wherein the body of each said cylinder is fixed to the bottom of the silo.

16. An apparatus as claimed in claim 15, wherein the piston of each cylinder is connected via a connecting piece to said revolving shaft.

* * * * *